United States Patent [19]

Tamaki

[11] Patent Number: 5,270,966
[45] Date of Patent: Dec. 14, 1993

[54] MAGNETO-OPTICAL MEMORY DEVICE FOR MULTI-WAVELENGTH RECORDING AND REPRODUCTION

[75] Inventor: Takahiko Tamaki, Tama, Japan
[73] Assignee: Nippon Hoso Kyokai, Japan
[21] Appl. No.: 937,476
[22] Filed: Aug. 28, 1992

[30] Foreign Application Priority Data

Sep. 2, 1991 [JP] Japan .................. 3-221862

[51] Int. Cl.$^5$ .............................................. G11C 13/06
[52] U.S. Cl. ........................ 365/122; 365/215; 360/114; 369/13; 428/694; 428/900
[58] Field of Search ............ 365/122, 215, 23, 6, 365/171, 173; 369/13; 360/59, 11; 428/69, 900

[56] References Cited

U.S. PATENT DOCUMENTS

| | | | |
|---|---|---|---|
| 4,645,722 | 2/1987 | Katayara et al. | 428/900 X |
| 4,664,977 | 5/1987 | Osato et al. | 428/900 X |
| 4,922,454 | 5/1990 | Taki | 365/122 |
| 5,058,099 | 10/1991 | Murakami et al. | 360/131 X |
| 5,143,798 | 9/1992 | Fujii | 369/13 X |

Primary Examiner—Eugene R. LaRoche
Assistant Examiner—Do Hyum Yoo
Attorney, Agent, or Firm—Marger, Johnson, McCollom & Stolowitz

[57] ABSTRACT

A rewritable magneto-optical memory device for multi-wavelength recording and reproduction having a high packing density. The device is form by a plurality of magnetic film layers, each of which has a unique characteristic wavelength at which optical absorption and magneto-optical effect occur simultaneously, in which a selective writing on one of the plurality of magnetic film layers is realized by using a writing light beam incident on the plurality of magnetic film layers which has a wavelength equal to the characteristic wavelength of that one of the plurality of magnetic film layers, and a selective reading from that one of the plurality of magnetic film layers is realized by measuring Faraday rotation angle of a reading light beam incident on the plurality of magnetic film layers which has a wavelength equal to the characteristic wavelength of that one of the plurality of magnetic film layers.

16 Claims, 4 Drawing Sheets

MAGNETO-OPTICAL MEMORY DEVICE FOR MULTI-WAVELENGTH RECORDING AND REPRODUCTION

BACKGROUND OF THE INVENTION

1. Field of the Invention

The present invention relates to a rewritable magneto-optical memory device for multi-wavelength recording and reproduction.

2. Description of the Background Art

Conventionally, a medium such as TbFeCo is widely known as a magneto-optical recording medium, in which the writing is made in a heat mode using the light as a heat source, and the reading is made by utilizing the Kerr effect.

However, a thin film formed by such a conventionally known magneto-optical recording medium has a large optical absorption loss, and in addition, there has been no known method to realize the multi-wavelength recording by using such a conventionally known magneto-optical recording medium, so that the magneto-optical multi-wavelength recording and reproduction has not been realized conventionally.

Moreover, it has been conventionally known that the packing density can be improved by piling up multiple layers of the magnetic films, but in a case of writing the recording bit selectively on a desired layer of the multi-layered magnetic films, it is indispensable to realize the focusing to the desired layer by using a lens so as to increase the temperature of the multi-layered magnetic films locally, without affecting the other layers of the multi-layered magnetic films. However, conventionally, a technique for focusing each of the very thin film layers selectively has not been realized in practice.

Furthermore, even if it becomes possible to write the recording bit somehow, the reproduction of the recorded signal components from the desired layer of the multi-layered magnetic films has been very difficult because the light signals from all of the multi-layered magnetic films are superposed each other at a time of the reproduction.

SUMMARY OF THE INVENTION

It is therefore an object of the present invention to provide a rewritable magneto-optical memory device for multi-wavelength recording and reproduction having a high packing density.

According to one aspect of the present invention there is provided a magneto-optical memory device, comprising: a plurality of magnetic film layers, each of which has a unique characteristic wavelength at which optical absorption and magneto-optical effect occur simultaneously; wherein a selective writing on one of the plurality of magnetic film layers is realized by using a writing light beam incident on said plurality of magnetic film layers which has a wavelength equal to the characteristic wavelength of said one of the plurality of magnetic film layers; and a selective reading from said one of the plurality of magnetic film layers is realized by measuring Faraday rotation angle of a reading light beam incident on said plurality of magnetic film layers which has a wavelength equal to the characteristic wavelength of said one of the plurality of magnetic film layers.

According to another aspect of the present invention there is provided a method of multi-wavelength recording and reproduction, comprising the steps of: (a) forming a magneto-optical memory device comprising a plurality of magnetic film layers, each of which has a unique characteristic wavelength at which optical absorption and magneto-optical effect occur simultaneously; (b) irradiating said plurality of magnetic film layers with a writing light beam having a wavelength equal to the characteristic wavelength of one of the plurality of magnetic film layers, so as to realize a selective writing on said one of the plurality of magnetic film layers; and (c) irradiating said plurality of magnetic film layers with a reading light beam incident on said plurality of magnetic film layers which has a wavelength equal to the characteristic wavelength of said one of the plurality of magnetic film layers, and measuring Faraday rotation angle of said reading light beam which passed through said plurality of magnetic film layers, so as to realize a selective reading from said one of the plurality of magnetic film layers.

Other features and advantages of the present invention will become apparent from the following description taken in conjunction with the accompanying drawings.

DETAILED DESCRIPTION OF THE PREFERRED EMBODIMENTS

Now, one embodiment of a magneto-optical memory device according to the present invention will be described in detail with references to the drawings.

Figure 1:
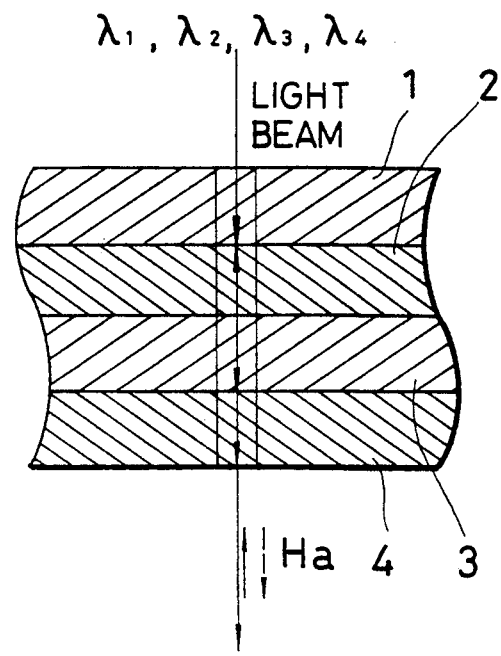
FIG. 1 is a cross sectional view of one embodiment of a magneto-optical memory device according to the present invention.
Figure 2:
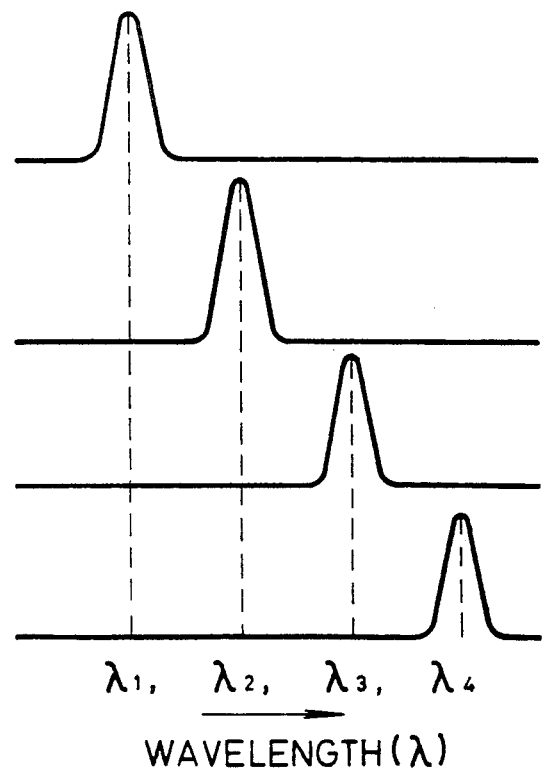
FIG. 2 is a diagram indicating characteristic wavelengths of magnetic film layers incorporated in the magneto-optical memory device of FIG. 1.

FIG. 1 shows a cross sectional view of a magneto-optical memory device of this embodiment, which comprises four magnetic film layers 1, 2, 3, and 4 having mutually different characteristic wavelengths $\lambda 1$, $\lambda 2$, $\lambda 3$, and $\lambda 4$, respectively, as shown in FIG. 2, at which the optical absorption and the magneto-optical effect can occur simultaneously.

With this configuration of FIG. 1, by irradiating light beams having the wavelength equal to the characteristic wavelengths $\lambda 1$, $\lambda 2$, $\lambda 3$, and $\lambda 4$ of the magnetic film layers 1, 2, 3, and 4, respectively, from a direction perpendicular to the layers of the magnetic film layers 1, 2, 3, and 4, as shown in FIG. 1, it becomes possible to make the selective reading or writing operation of recording bit on each of the magnetic film layers 1, 2, 3, and 4 by the light beams having the respective characteristic wavelengths, simultaneously, so as to realize a multi-wavelength recording and reproduction.

Here, each of the magnetic film layers 1, 2, 3, and 4 has its own unique characteristic wavelength λ1, λ2, λ3, and λ4, respectively, at which the optical absorption and the magneto-optical effect can occur simultaneously, so that when writing light beam having the wavelength equal to λ4 is incident on this magneto-optical memory device of FIG. 1, for example, only the magnetic film layer 4 makes the optical absorption while the other three magnetic film layers 1 to 3 are unaffected by this writing light beam. As a result, the magnetic film layer 4 which absorbed this writing light beam has its temperature increased and its magnetic coercive force Hc decreased, such that the domain recording the direction (downward direction in FIG. 1) of the applied magnetic field Ha is formed on the magnetic film layer 4, so as to realize the selective writing operation on the magnetic film layer 4. Similarly, the selective writing operation can be made on any one of the other magnetic film layers 1, 2, and 3 by using the corresponding writing light beams having the wavelengths equal to the characteristic wavelengths λ1, λ2, and λ3 of the corresponding one of these magnetic film layers 1, 2, and 3, respectively.

On the other hand, the selective reading operation can be made on any one of the magnetic film layers 1, 2, 3, and 4 by irradiating reading light beams having the wavelengths equal to the characteristic wavelengths λ1, λ2, λ3, and λ4 of the magnetic film layers 1, 2, 3, and 4, respectively, as follows. Namely, each of these reading light beams passing through the corresponding one of the magnetic film layers 1, 2, 3, and 4 having the corresponding characteristic wavelengths receives the larger Faraday rotation than the other ones of these reading light beams having the different wavelengths, so that the selective reading operation on each of the magnetic film layers 1, 2, 3, and 4 can be realized by measuring the Faraday rotation angle of the corresponding one of the reading light beams which passed through this magneto-optical memory device.

It is to be noted that in a case of using a magnetic film layer which has more than one characteristic wavelengths at which the optical absorption and the magneto-optical effect can occur simultaneously, it is possible to use the reading light beam having the wavelength equal to shorter one of the characteristic wavelengths which is short enough to realize a sufficiently high S/N ratio, and the writing light beam having the wavelength for which the laser output power is the greatest.

It is also to be noted that the magneto-optical memory device of FIG. 1 may be further equipped with a reflection film layer at a bottom of the lowest magnetic film layer 4 in the direction of the incident light beams, such that the measurement of the Faraday rotation angles of the reading light beams can be made at the upper side of the magneto-optical memory device instead of the lower side as described above.

It is further to be noted that the number of the magnetic film layers to be incorporated in this magneto-optical memory device is not limited to four used in the above description, and can be set to be any desired number. In general, with respect to a case of using only one magnetic film layer, the device incorporating N magnetic film layers can realize the N times larger packing density and the N times faster access speed.

In the configuration of FIG. 1, in a case the adjacent magnetic film layers are layered very closely with each other such that the magnetic moment between the adjacent magnetic film layers becomes large, it is preferable to provide an insulation layer for weakening the static magnetic coupling between the adjacent magnetic film layers. Here, such an insulation layer should have a sufficient thickness to prevent the occurrence of the false writing and the copying at one magnetic film layer due to the temperature increase caused by the heat conduction from the adjacent magnetic film layers. Such an insulation layer can be formed by a material which is non-magnetic and which makes little optical absorption, such as silicon dioxide and Bi substituted rare earth iron garnet with a composition of $R_{3-x}Bi_x$-$Fe_{5-y}M_yO_{12}$, where M stands for non-magnetic ions of at least one of Ga, Al, In, and Sc, and R stands for a rare earth element.

Now, the further detail of the magneto-optical memory device of this embodiment will be described.

In this embodiment, the magnetic material for forming the magnetic film layer has a composition of a Bi substituted rare earth iron garnet $R_{3-x}Bi_xFe_5O_{12}$, where R stands for any one or more of the rare earth ions of Tb, Er, Eu, Ce, Pr, Nd, Sm, Dy, Ho, Tm, and Yb, and in which the optical absorption and the magneto-optical effect of any of Tb, Er, Eu, Ce, Pr, Nd, Sm, Dy, Ho, Tm, and Yb can be utilized for the purpose of the selective reading and writing operation. In addition, the magnetic property of the magnetic film layer may be improved further by replacing Fe in the above described iron garnet with any one of Ga, Al, Co, and In.

Figure 3A:
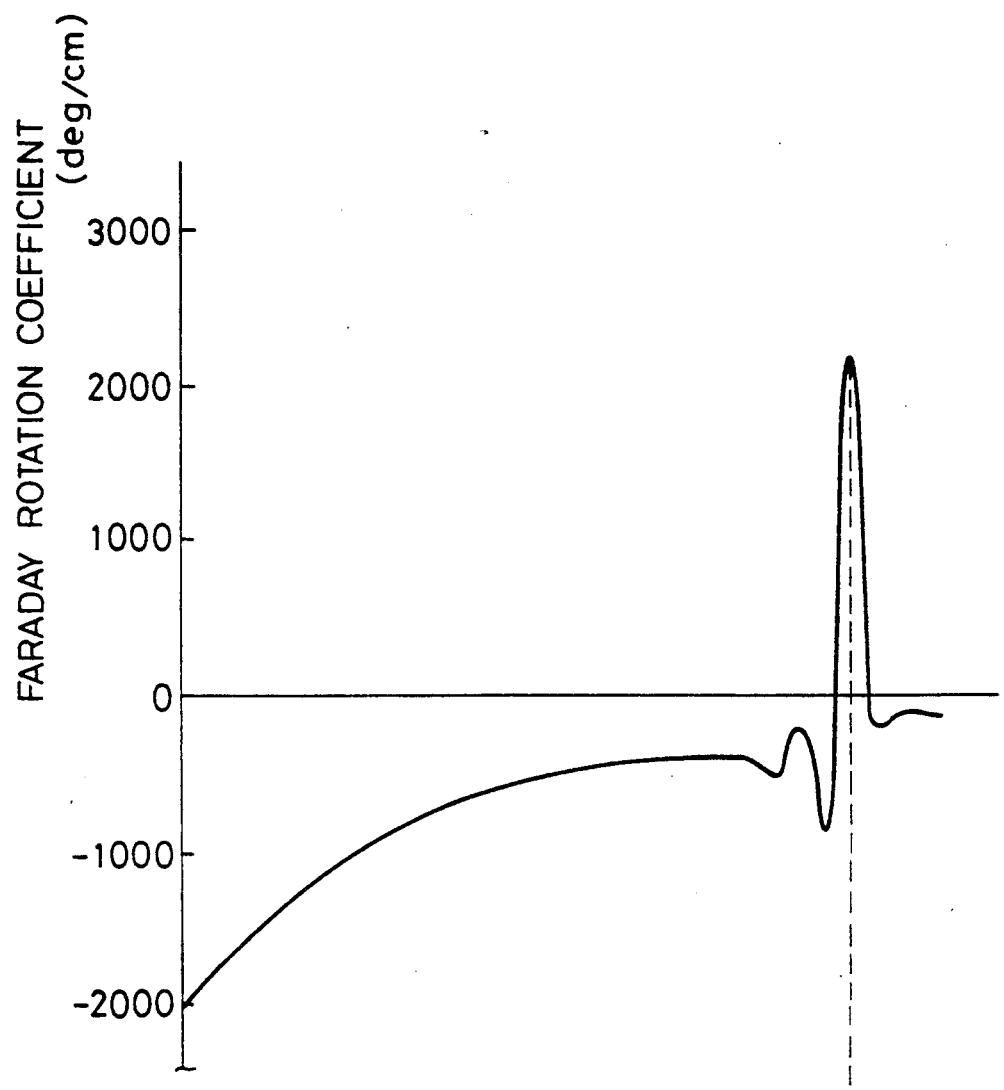
FIGS. 3A and 3B are Faraday rotation spectrum and optical absorption spectrum, respectively, of a magnetic material TbBiGaIG which can be used as the magnetic film layer in the magneto-optical memory device of FIG. 1.
Figure 3B:
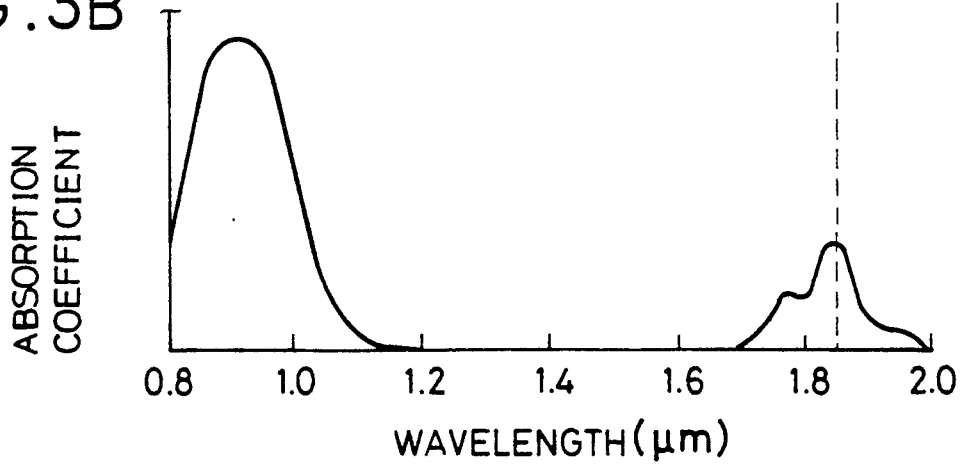

As an example, the magnetic film layer can be formed by the magnetic material in a form of an iron garnet $Tb_{2.56}Bi_{0.44}Fe_{4.95}Ga_{0.05}O_{12}$ (which will be abbreviated hereafter as TbBiGaIG), which has the Faraday rotation spectrum and the optical absorption spectrum as shown in FIGS. 3A and 3B, respectively. As can be seen in FIG. 3B, this magnetic material is substantially transparent for the wavelength in a range of 1.1 to 1.7 μm, but makes the optical absorption in a vicinity of the wavelength of 0.9 μm (which is due to the iron) and approximately 1.85 μm. As for the Faraday rotation, as can be seen in FIG. 3A, there is hardly any Faraday rotation in a vicinity of the wavelength of 0.9 μm corresponding to the optical absorption due to the iron, but there is an abrupt increase of the Faraday rotation in a vicinity of the wavelength of 1.85 μm. Thus, the selective reading and writing operation can be made with high S/N ratio by the light beam having the wavelength equal to 1.85 μm on the magnetic film layer formed by this TbBiGaIG.

Figure 4A:
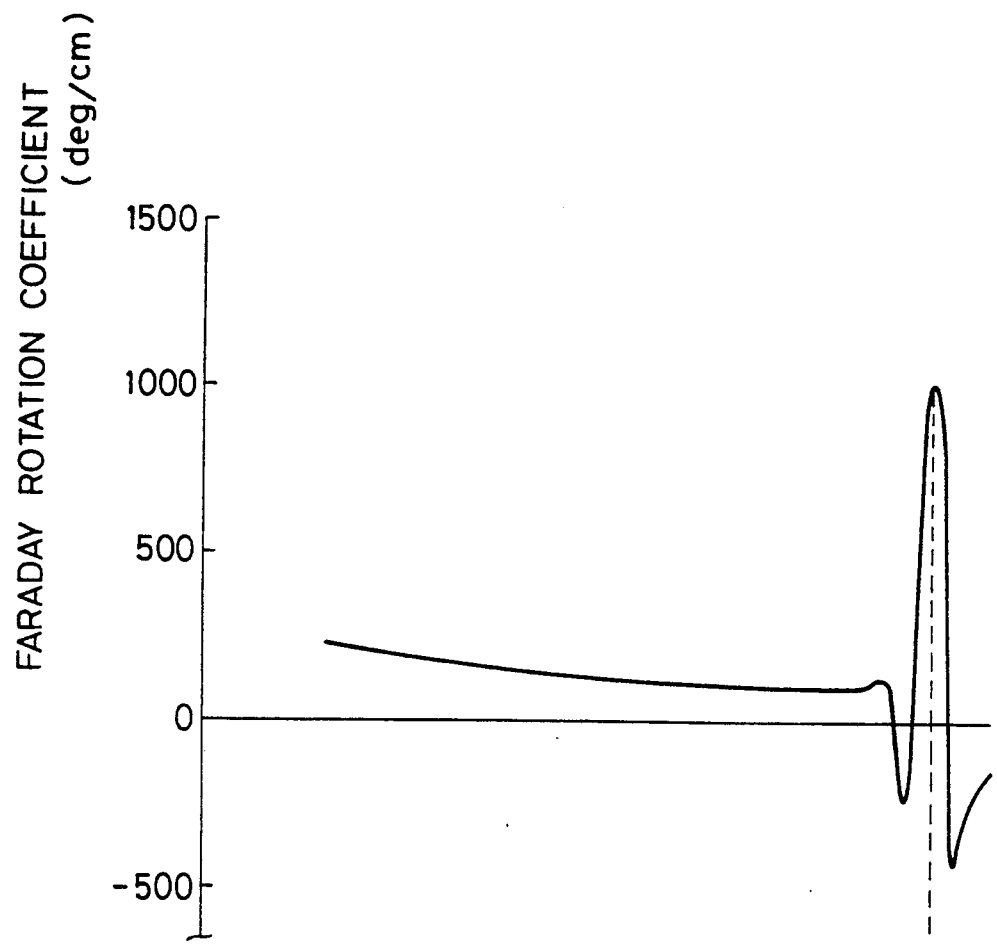
FIGS. 4A and 4B are Faraday rotation spectrum and optical absorption spectrum, respectively, of a magnetic material EuIG which can be used as the magnetic film layer in the magneto-optical memory device of FIG. 1.
Figure 4B:
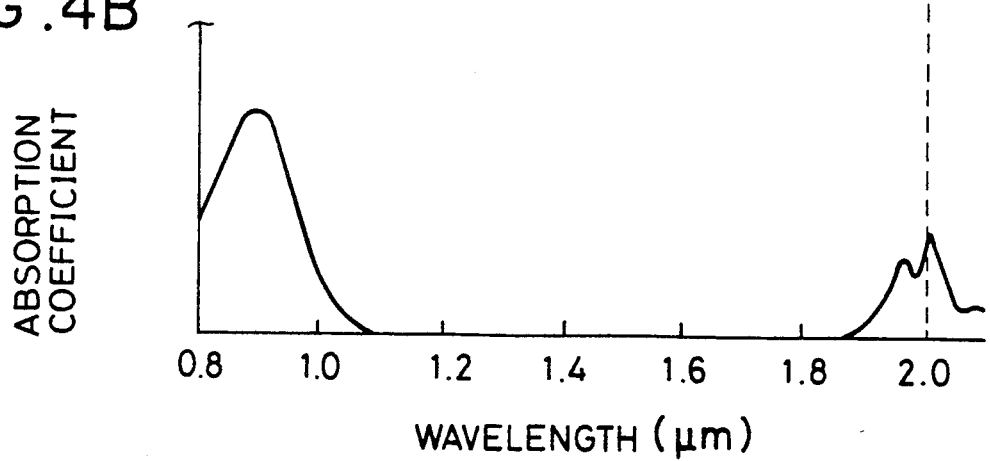

As another example, the magnetic film layer can be formed by the magnetic material in a form of an iron garnet $Eu_3Fe_5O_{12}$ (which will be abbreviated hereafter as EuIG), which has the Faraday rotation spectrum and the optical absorption spectrum as shown in FIGS. 4A and 4B, respectively, which indicate that the optical absorption and the Faraday rotation occur simultaneously in a vicinity of the wavelength of 2 μm in this EuIG, so that the selective reading and writing operation can be made with high S/N ratio by the light beam having the wavelength equal to 2 μm on the magnetic film layer formed by this EuIG.

Figure 5A:
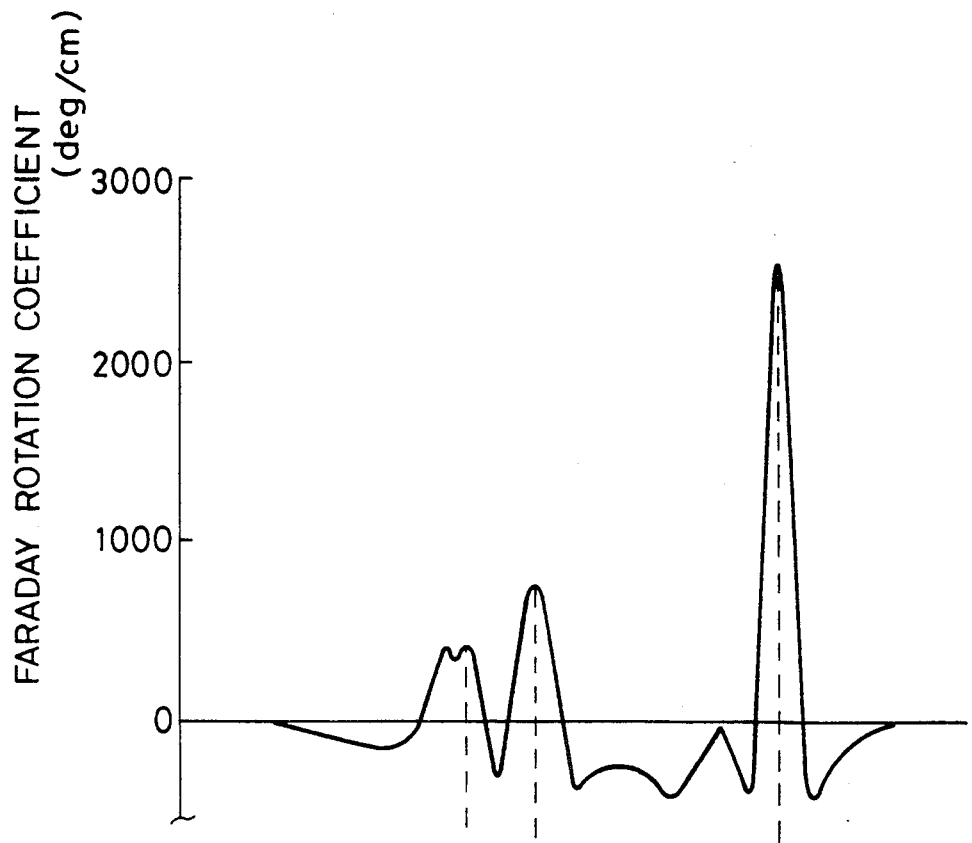
FIGS. 5A and 5B are Faraday rotation spectrum and optical absorption spectrum, respectively, of a magnetic material ErIG which can be used as the magnetic film layer in the magneto-optical memory device of FIG. 1.
Figure 5B:
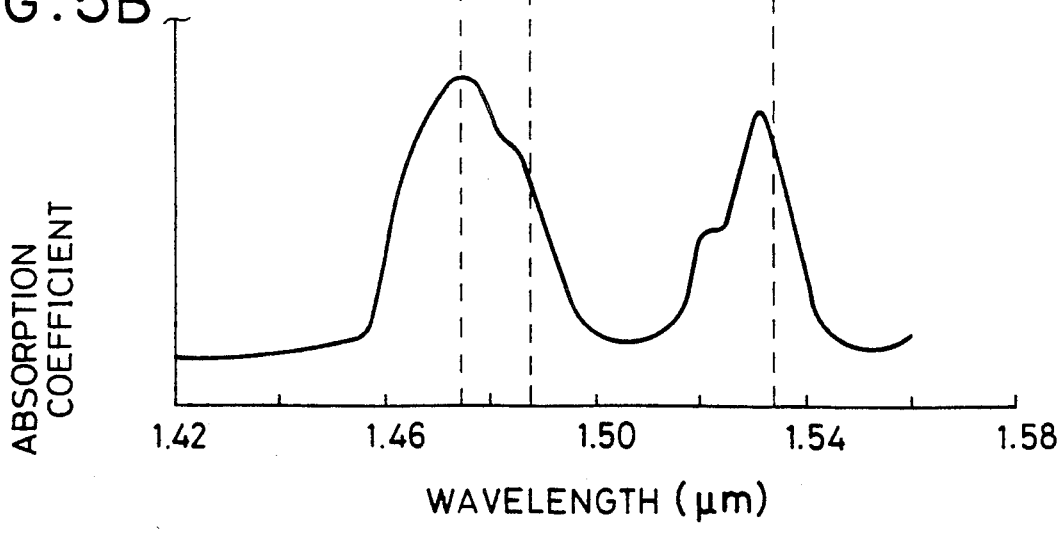

As another example, the magnetic film layer can be formed by the magnetic material in a form of an iron garnet $Er_3Fe_5O_{12}$ (which will be abbreviated hereafter as ErIG), which has the Faraday rotation spectrum and the optical absorption spectrum as shown in FIGS. 5A and 5B, respectively, which indicate that the optical absorption and the Faraday rotation occur simultaneously in a vicinity of the wavelengths of 1.47 μm and 1.53 μm in this ErIG, so that the selective reading and writing operation can be made with high S/N ratio by the light beam having the wavelength equal to either 1,47 μm or 1.53 μm on the magnetic film layer formed by this ErIG.

As the other examples, the magnetic film layer can be formed by any one of an iron garnet $Dy_{3-x}Bi_xFe_5O_{12}$ which makes the optical absorption and the Faraday rotation simultaneously at the wavelengths of 1.09 μm, 1.2 μm, and 1.69 μm, an iron garnet $Tm_{3-x}Bi_xFe_5O_{12}$ which makes the optical absorption and the Faraday rotation simultaneously at the wavelengths of 1.2 μm, 1.7 μm, and 1.75 μm, an iron garnet $Ho_{3-x}Bi_xFe_5O_{12}$ which makes the optical absorption and the Faraday rotation simultaneously at the wavelengths of 1.13 μm, 1.2 μm, 1.9 μm, and 2.1 μm. Similarly, the magnetic film layer can be formed by any one of the other iron garnets including any one of Ce, Pr, Nd, Sm, and Yb, which also have the characteristic wavelengths for the simultaneous occurrence of the optical absorption and the Faraday rotation.

It is to be noted that the magnetic film layer may be formed by crystals of the iron garnet including a plurality of the rare earth ions such as Tb and Eu, or Eu and Er, or Tb and Ce, etc., as such crystals also have the same characteristic wavelengths of the rare earth iron garnet contained therein.

In addition, the magnetic properties such as the Curie temperature, the compensation trmperature, and the saturation magnetic field can be modified in the various rare earth iron garnets enumerated above by replacing Fe in the garnet crystal with Ga, Al, Co, and In. Furthermore, by adjusting the amount of Bi substituted into the rare earth element in the various rare earth iron garnets enumerated above, the Faraday rotation angle can be modified.

Here, it is necessary for each of the magnetic film layers to be a vertically magnetized layer which is magnetized in a direction normal to the plane of the layer, and such a vertically magnetized layer can be formed by utilizing the distortion induction or the crystallomagnetic anisotropy.

Moreover, any other material having the identical wavelength for the occurrence of the optical absorption and the occurrence of the magneto-optical effect, such as $NdFeO_3$ and $TbFeO_3$ may be used for forming the magnetic film layer.

In this embodiment, the magnetic film layers can be layered by using the layer formation method such as sputtering method, evaporation method, and laser absorption method, while each layer can be formed by using the film formation method such as MOCVD method, LPE method, and Sol-gel method.

Hereinbelow, the test results for the various types of the magneto-optical memory device described above will be discussed.

TEST 1

The magneto-optical memory device of the embodiment described above was formed by using the EuIG and the ErIG as the rare earth iron garnets for forming the magnetic film layers which are layered on the glass substrate.

Then, the optical absorption and the magneto-optical effect in this magneto-optical memory device were measured by using the light beams with the wavelengths 2.0 μm, 1.535 μm, 1.485 μm, and 1.47 μm.

As a result, the simultaneous occurrence of the optical absorption and the magneto-optical effect for these rare earth iron garnets were observed, and the realization of the desired multi-wavelength recording and reproduction had been confirmed.

TEST 2

The magneto-optical memory device of the embodiment described above was formed by using the TbYBiGaIG and the DyYBiAlIG as the rare earth iron garnets for forming the magnetic film layers which are layered on the glass substrate.

Then, the optical absorption and the magneto-optical effect in this magneto-optical memory device were measured by using the light beams with the wavelengths 1.85 μm, and 1.09 μm.

As a result, the simultaneous occurrence of the optical absorption and the magneto-optical effect for these rare earth iron garnets were observed, and the realization of the desired multi-wavelength recording and reproduction had been confirmed.

In addition, it was confirmed that the saturation magnetic field property can be improved by replacing Fe with non-magnetic elements Ga and Al.

TEST 3

The magneto-optical memory device of the embodiment described above was formed by using the TbBiIG and the EuIG as the rare earth iron garnets for forming the magnetic film layers which are layered on the glass substrate, with an insulation layer made of Bi substituted rare earth iron garnet with a composition of $Tb_{3-x}Bi_xFe_{2.5}Ga_{2.5}O_{12}$ inserted between adjacent magnetic film layers.

Then, the optical absorption and the magneto-optical effect in this magneto-optical memory device were measured by using the light beams with the wavelengths 1.85 μm, and 2.0 μm.

As a result, the simultaneous occurrence of the optical absorption and the magneto-optical effect for these rare earth iron garnets were observed, and the realization of the desired multi-wavelength recording and reproduction had been confirmed.

In addition, it was confirmed that the prevention of the false writing and the copying can be achieved by the inclusion of the insulation layer between the adjacent magnetic film layers.

TEST 4

The magneto-optical memory device of the embodiment described above was formed by using the $TbFeO_3$ and $ErFeO_3$ as the magnetic material for forming the magnetic film layers, each of which is layered on the glass substrate, and polished to the thickness of approximately 10 μm.

Then, the optical absorption and the magneto-optical effect in this magneto-optical memory device were measured by using the light beams with the wavelengths 1.8 μm, 1.54 μm, and 1.49 μm.

As a result, the simultaneous occurrence of the optical absorption and the magneto-optical effect for these rare earth iron garnets were observed, and the realization of the desired multi-wavelength recording and reproduction had been confirmed.

TEST 5

The magneto-optical memory device of the embodiment described above was formed by using the Bi substituted rare earth garnet including the rare earth elements Lu, Gd, and Y as the magnetic material for forming the magnetic film layers.

Then, the optical absorption and the magneto-optical effect in this magneto-optical memory device were measured by using the light beams with various wavelengths, but failed to observe any optical absorption and the associated abrupt increase of the Faraday rotation angle as this rare earth garnet does not have any characteristic wavelenght.

As a result, the selective magneto-optical recording and reproduction was not realized in this magneto-optical memory device.

As described, according to the present invention, it becomes possible to provide a rewritable magneto-optical memory device for multi-wavelength recording and reproduction having a high packing density by using the magnetic film layers having different characteristic wavelengths. As a result, it becomes possible to provide a large capacity memory with a compact device size.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A magneto-optical memory device, comprising:
   a plurality of magnetic film layers, each of which has a unique characteristic wavelength at which optical absorption and magneto-optical effect occur simultaneously;
   wherein a selective writing on one of the plurality of magnetic film layers is realized by using a writing light beam incident on said plurality of magnetic film layers which has a wavelength equal to the characteristic wavelength of said one of the plurality of magnetic film layers; and
   a selective reading from said one of the plurality of magnetic film layers is realized by measuring Faraday rotation angle of a reading light beam incident on said plurality of magnetic film layers which has a wavelength equal to the characteristic wavelength of said one of the plurality of magnetic film layers.

2. The magneto-optical memory device of claim 1, further comprising a transparent and non-magnetic insulation layer sandwiched between adjacent ones of said plurality of magnetic film layers.

3. The magneto-optical memory device of claim 2, wherein the insulation layer is made of a Bi substituted rare earth iron garnet having a composition of $R_{3-x}Bi_xFe_{5-y}M_yO_{12}$, where R is a rare earth element and M is non-magnetic ions of at least one of Ga, Al, In, and Sc.

4. The magneto-optical memory device of claim 2, wherein the insulation layer is made of a silicon dioxide.

5. The magneto-optical memory device of claim 1, wherein each of the plurality of magnetic film layers is formed by a Bi substituted rare earth iron garnet.

6. The magneto-optical memory device of claim 5, wherein the Bi substituted rare earth iron garnet has any one of Ga, Al, Co, and In substituted into a part of irons.

7. The magneto-optical memory device of claim 5, wherein the Bi substituted rare earth iron garnet had a composition of $R_{3-x}Bi_xFe_5O_{12}$, where R is at least one of Tb, Er, Eu, Ce, Pr, Nd, Sm, Dy, Ho, Tm, and Yb.

8. The magneto-optical memory device of claim 1, wherein:
   one of said plurality of magnetic film layers has at least one another characteristic wavelength at which optical absorption and magneto-optical effect occur simultaneously;
   the selective writing on said one of the plurality of magnetic film layers is realized by using a light beam having a wavelength equal to one of the characteristic wavelengths of said one of the plurality of magnetic film layers for which a laser output power is greatest; and
   the selective reading from said one of the plurality of magnetic film layers is realized by using a light beam having a wavelength equal to shorter one of the characteristic wavelengths of said one of the plurality of magnetic film layers which is short enough to realize a sufficiently high S/N ratio.

9. A method of multi-wavelength recording and reproduction, comprising the steps of:
   (a) forming a magneto-optical memory device comprising a plurality of magnetic film layers, each of which has a unique characteristic wavelength at which optical absorption and magneto-optical effect occur simultaneously;
   (b) irradiating said plurality of magnetic film layers with a writing light beam having a wavelength equal to the characteristic wavelength of one of the plurality of magnetic film layers, so as to realize a selective writing on said one of the plurality of magnetic film layers; and
   (c) irradiating said plurality of magnetic film layers with a reading light beam incident on said plurality of magnetic film layers which has a wavelength equal to the characteristic wavelength of said one of the plurality of magnetic film layers, and measuring Faraday rotation angle of said reading light beam which passed through said plurality of magnetic film layers, so as to realize a selective reading from said one of the plurality of magnetic film layers.

10. The method of claim 9, further wherein at the step (a), the magneto-optical memory device further comprises a transparent and non-magnetic insulation layer sandwiched between adjacent ones of said plurality of magnetic film layers.

11. The method of claim 10, wherein at the step (a), the insulation layer is made of a Bi substituted rare earth iron garnet having a composition of $R_{3-x}Bi_xFe_{5-y}M_yO_{12}$, where R is a rare earth element and M is non-magnetic ions of at least one of Ga, Al, In, and Sc.

12. The method of claim 10, wherein at the step (a), the insulation layer is made of a silicon dioxide.

13. The method of claim 9, wherein at the step (a), each of the plurality of magnetic film layers is formed by a Bi substituted rare earth iron garnet.

14. The method of claim 13, wherein at the step (a), the Bi substituted rare earth iron garnet has any one of Ga, Al, Co, and In substituted into a part of irons.

15. The method of claim 13, wherein at the step (a), the Bi substituted rare earth iron garnet has a composition of $R_{3-x}Bi_xFe_5O_{12}$, where R is at least one of Tb, Er, Eu, Ce, Pr, Nd, Sm, Dy, Ho, Tm, and Yb.

16. The method of claim 9, wherein:
   at the step (a), one of said plurality of magnetic film layers has at least one another characteristic wavelength at which optical absorption and magneto-optical effect occur simultaneously;

at the step (b), the selective writing on said one of the plurality of magnetic film layers is realized by using a light beam having a wavelength equal to one of the characteristic wavelengths of said one of the plurality of magnetic film layers for which a laser output power is greatest; and at the step (c), the selective reading from said one of the plurality of magnetic film layers is realized by using a light beam having a wavelength equal to shorter one of the characteristic wavelengths of said one of the plurality of magnetic film layers which is short enough to realize a sufficiently high S/N ratio.

* * * * *